(12) United States Patent
Jang et al.

(10) Patent No.: US 7,394,777 B2
(45) Date of Patent: Jul. 1, 2008

(54) METHOD AND APPARATUS FOR BASE STATION TRANSMITTING BROADCAST MULTICAST SERVICE(S) ON TRAFFIC CHANNEL

(75) Inventors: Ke-Chi Jang, Plano, TX (US); Ching-Chung Wang, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 466 days.

(21) Appl. No.: 10/903,207

(22) Filed: Jul. 30, 2004

(65) Prior Publication Data

US 2005/0025082 A1     Feb. 3, 2005

(51) Int. Cl.
*H04H 1/00* (2006.01)

(52) U.S. Cl. .................. 370/312; 370/328; 370/331; 455/414.3; 455/452.1; 725/81

(58) Field of Classification Search .......... 370/328, 370/329, 312, 331; 455/414.3, 452.1; 725/81
See application file for complete search history.

(56) References Cited

U.S. PATENT DOCUMENTS

| | | | |
|---|---|---|---|
| 6,144,651 A | 11/2000 | Felix et al. | |
| 7,062,272 B2 * | 6/2006 | Grilli et al. | 455/435.1 |
| 7,096,024 B2 * | 8/2006 | Sinnarajah et al. | 455/445 |
| 2003/0134622 A1 | 7/2003 | Hsu et al. | |
| 2003/0147389 A1 | 8/2003 | Zirwas | |
| 2004/0202336 A1 * | 10/2004 | Watson et al. | 381/92 |
| 2005/0203655 A1 * | 9/2005 | Tsai | 700/101 |

FOREIGN PATENT DOCUMENTS

DE    100 17 929    11/2001

* cited by examiner

*Primary Examiner*—Danh Le

(57) ABSTRACT

In accordance with the teachings of the present invention, a method and apparatus of performing traffic mode broadcast multicast is implemented by leveraging the existing traffic channel structure and infrastructure. In one embodiment, a method and apparatus is presented for providing broadcast multicast service using the traffic channel, specifically the supplemental channel.

20 Claims, 6 Drawing Sheets

METHOD AND APPARATUS FOR BASE STATION TRANSMITTING BROADCAST MULTICAST SERVICE(S) ON TRAFFIC CHANNEL

BACKGROUND OF THE INVENTION

1. Field of the Invention

This invention relates to communication networks.

2. Description of the Prior Art

A variety of value added features have been developed for wireless technology. One of these features is known as the broadcast multicast feature. The broadcast multicast feature enables a mobile device to receive broadcast data or messages. For example, the mobile may receive a movie clip, text or stock option information using the broadcast multicast feature. Physically the broadcast is one way from the base station to the mobile end-user.

The broadcast multicast feature occurs when the mobile is in idle mode. When the broadcast multicast feature is implemented and the mobile is in the idle mode the broadcast multicast feature is called idle mode broadcast multicast. In Idle mode broadcast multicast, the mobile is turned on and if there is a broadcast or multicast service, an end end-user can subscribe to the service and receive a video clip, etc over the air when they are not on a call. The broadcast is from the base station to the mobile.

The channels used when the mobile is in the traffic state are referred to as traffic channels. There are several types of traffic channels such as, the supplemental channel, the fundamental channel, etc. Dedicated mode is also another name for traffic mode. In addition, the channels used when the mobile is in the idle state are referred to as common channels. For example, when an end end-user turns on the mobile and receives common channel signaling messages, receives a page, etc, they are on the common channel. In addition, when the mobile is not participating in a call the mobile is said to be in idle state and on a common channel. Common mode is also another name used when the mobile is in the idle state.

There are a number of problems associated with the broadcast multicast service. There is no power feedback in the idle state. For example, an end end-user may be standing immediately in front of an antenna so not as much power is required to transmit information. Another end end-user may be at the end of the cell where more power is required to transmit information. In idle mode power control management based on the location of the end end-user is not possible with current implementations. New power control mechanisms have to be implemented to minimize the problem stated.

When there are a large number of end end-users collocated in a very small area (i.e., a stadium) it makes sense to transmit information on the common channel because there are many people in a confined region. However, if end end-users are spread out over a region, why take the time to create a channel and then make all of the modifications to implement the idle mode broadcast multicast. In a sparsely populated area idle mode broadcast multicast is not as efficient.

Thus there is a need for a method and apparatus that addresses the problems associated with idle mode broadcast multicast service.

SUMMARY OF THE INVENTION

In accordance with the teachings of the present invention, a method and apparatus for performing traffic mode broadcast multicast using the existing traffic channel structure and infrastructure is presented.

The method includes methods for: 1) communicating traffic mode BCMCS program information to idle mobiles; 2) implementing a traffic channel with a BCMCS monitor request; 3) establishing a shared supplemental channel; 4) providing broadcast request update while the mobile is in the traffic state; 5) changing from traffic mode BCMCS monitoring to idle mode BCMCS monitoring; and 6) providing BCMCS error messages to the mobile.

A method of operating comprises the steps of operating a traffic channel; and providing broadcast multicast service in response to operating the traffic channel. In one embodiment, the traffic channel is implemented with the supplemental channel.

A method of implementing broadcast multicast services comprises the steps of communicating a broadcast system parameter message; and providing program information to a mobile in response to communicating the broadcast system parameter message.

A method of implementing broadcast multicast services comprises the steps of receiving an origination message including information identifying a program selected for monitoring by mobile; and communicating messages to facilitate the monitoring of the program in response to receiving the origination message.

A method of implementing broadcast multicast services comprises the steps of communicating and extended channel assignment message to a mobile; and establishing broadcast multicast services with the mobile in response to communicating the extended channel assignment message.

A method of implementing broadcast multicast services comprises the steps of communicating a universal handoff direction message to a mobile; and providing a broadcast program update in response to communicating the universal handoff direction.

A method of implementing broadcast multicast services comprises the steps of communicating a universal handoff direction message to a mobile; and providing a broadcast program update in response to communicating the universal handoff direction message.

A method of implementing broadcast multicast services comprises the steps of communicating an extended release message to a mobile; and the mobile changing from traffic mode broadcast multicast services to idle mode broadcast multicast services in response to receiving the release message.

A method of implementing broadcast multicast services comprises the steps of receiving a broadcast multicast service request; and communicating an error message detailing why the broadcast multicast service request is denied.

DESCRIPTION OF THE INVENTION

Figure 1:
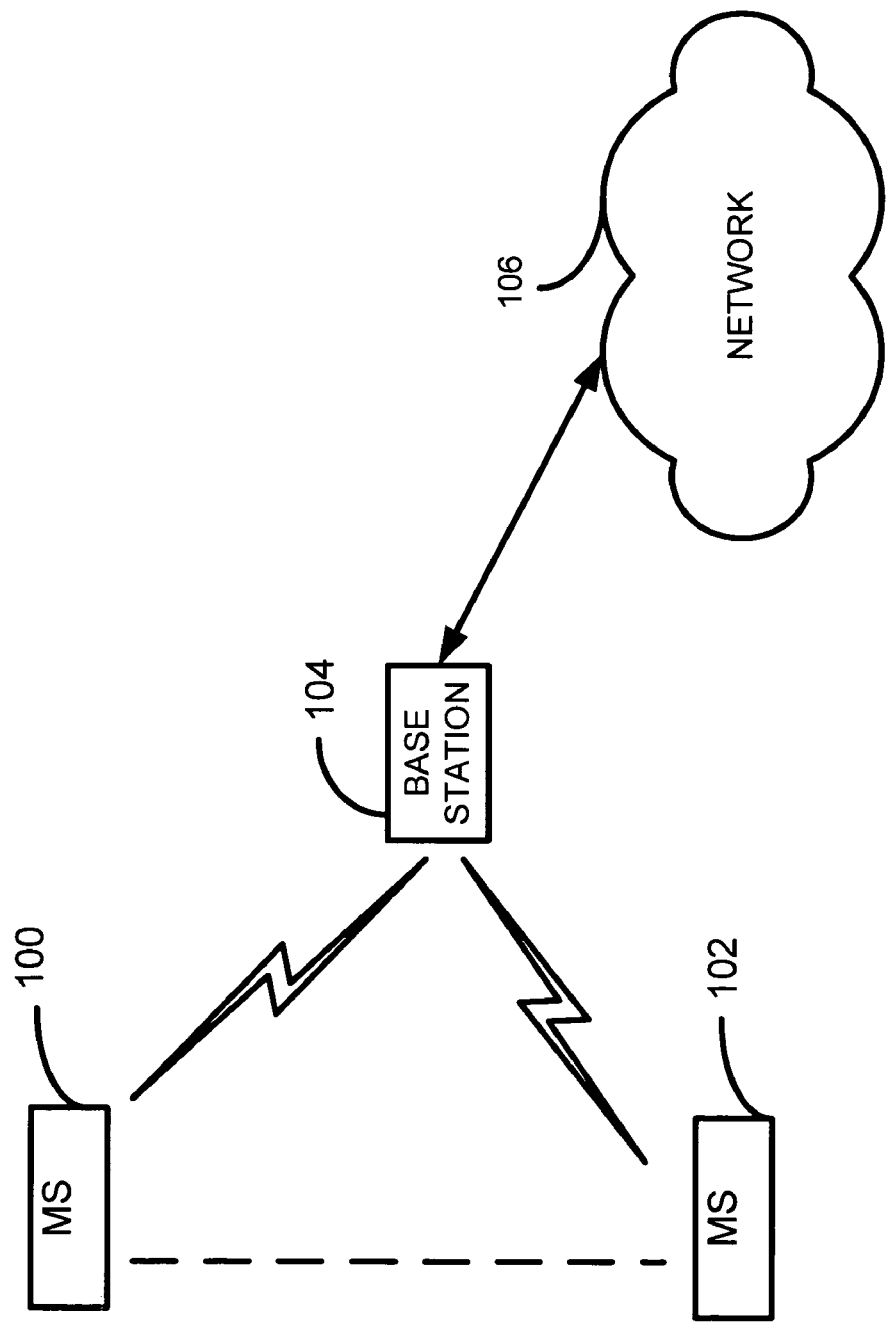
FIG. 1 displays a network implementing the teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In accordance with the teachings of the present invention broadcast multicast services (BCMCS) are implemented on a traffic channel. Specifically, the broadcast multicast services are implemented in the supplemental channel. In order to achieve this objective, regardless of idle mode or traffic mode broadcast multicast, the network has to transmit the broadcast multicast service over the air to let the mobile station know that the service is available. In one embodiment, this is transmitted over the air using the common channel. In addition, since we are going to implement the traffic mode we also need to transmit traffic mode information over the air and tell the mobile station what programs are available through the broadcast/multicast service (i.e., HBO, internet, etc).

Part of this process covers how to manage the idle state, for example, how to provide a TV list to the mobile station, when the mobile is in the idle state. So even before the mobile station gets onto the traffic channel the mobile station needs to know what programs are available at a specific moment on time. The mobile station receives the information and the end-users go down the channel list and then determine what they want to watch. The end-user may not know that they are in traffic mode, this is all transparent to the end-user. The end-user may then select the specific program that they would like to watch and the mobile has already received the information about the program (i.e., what mode and what channel is the program offered on) so mobile knows where and how to monitor the program.

In one embodiment, to monitor the program the mobile will set up the traffic channel sending an origination message to the base station. The base station communicates an extended channel assignment message to assign a channel to the mobile station. Then using a supplemental channel assignment message the base station assigns a forward supplemental channel to the mobile station and also provide an LPN table that provides a logical-to-physical mapping using the supplemental channel. The mobile station can decode this information and the end end-user is then able to watch the program.

In accordance with the teachings of the present invention, the following terms presented below are defined in accordance with TIA/EIA IS-2000.5-C, Signaling Standards for cdma2000 Spread Spectrum Systems—Release C, May 2002 and 3GPP2, C23-20020708-007-R1(Signaling-Support-for-Broadcast-Service).doc—Jul. 28, 2003, which are both herein incorporated by reference.

| TERM | DEFINITION |
| --- | --- |
| BCMCS | Broadcast Multicast Services. |
| MCNCS_FLOW_ID | BCMCS flow identifier. This is used to identify the broadcast service. |
| BS | Base Station. |
| BSPM | Broadcast System parameters Message. |
| ECAM | Extended Channel Assignment Message. |
| EOM | Enhanced Origination Message. |
| ERM | Extended Release Message. |
| ESCAM | Extended Supplemental Channel Message. |
| Dedicated Mode | Broadcast Services transmitted on traffic channel. |
| F-FCH | Forward Fundamental Channel. |
| F-DCCH | Forward Dedicated Control Channel. |
| F-SCH | Forward Supplemental Channel. |
| Fundicated Channel | Fundamental Channel, Dedicated Control Channel, or both. |
| LPM | Logical-to-Physical Mapping. The technique for forming associations between logical and physical channels. |
| Long Code | A PN sequence with period $2^{42} - 1$ that is used for scrambling on the Forward CDMA Channel and spreading on the Reverse CDMA Channel. The long code uniquely identifies a mobile station on both the Reverse Traffic Channel and the Forward Traffic Channel. |
| MS | Mobile Station. |
| ORM | Origination Message. |
| PLCM | Public Long Code Mask. A 42-bit binary number that creates the unique identity of the long code. The long code characterized by the public long code mask. |
| RCNM | Reconnection Message. |
| r-dsch | Reverse link Dedicated Signaling Channel. |
| SCM | Service Connect Message. |
| Shared Mode | Broadcast services transmitted in Idle state. |
| UHDM | Universal Handoff Direction Message. |

FIG. 1 displays an architecture of a network performing broadcast multicast services. In FIG. 1 a plurality of mobiles 100 to 102 communicate with the base station 104. In accordance with the teachings of one embodiment of the present invention, the base station may perform BCMCS with the mobiles 100 to 102 on the supplemental channel. The base station 104 is also shown in communication with the network 106.

Figure 2:
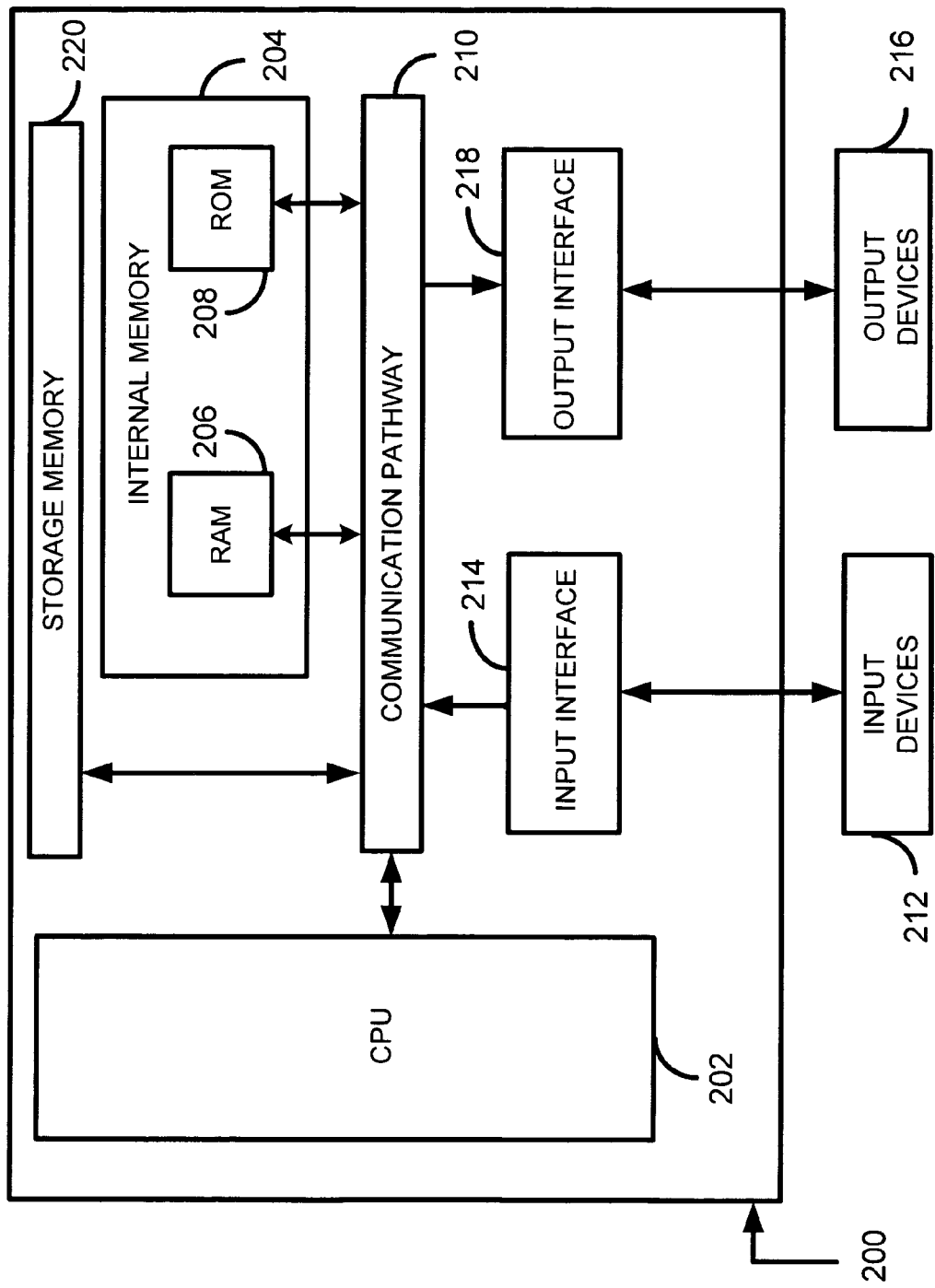
FIG. 2 displays a network implementing the teachings of the present invention.

FIG. 2 displays a computer architecture implementing the teachings of the present invention. The computer 200 of FIG. 2 may implement the mobile station (MS) 100, the mobile station 102, the base station (BS) 104 and the network 106 of FIG. 1. A central processing unit (CPU) 202 functions as the brain of the computer 200. Internal memory 204 is shown. The internal memory 204 includes short-term memory 206 and long-term memory 208. The short-term memory 206 may be a Random Access Memory (RAM) or a memory cache used for staging information. The long-term memory 208 may be a Read Only Memory (ROM) or an alternative form of memory used for storing information. Storage memory 220 may be any memory residing within the computer 200 other than internal memory 204. In one embodiment of the present invention, storage memory 220 is implemented with a hard drive. A communication pathway 210 is used to communicate information within computer 200. In addition, the communication pathway 210 may be connected to interfaces, which communicate information out of the computer 200 or receive information into the computer 200.

Input devices, such as tactile input device, joystick, keyboards, microphone, communications connections, or a mouse, are shown as 212. The input devices 212 interface with computer 200 through an input interface 214. Output devices, such as a monitor, speakers, communications connections, etc., are shown as 216. The output devices 216 communicate with computer 200 through an output interface 218.

In one embodiment, a variety of signaling and messaging changes have been performed to enable the methods of the present invention to operate in accordance with TIA/EIA IS-2000.5-C, Signaling Standards for cdma2000 Spread Spectrum Systems—Release C, May 2002 and 3GPP2, C23-20020708-007-R1(Signaling-Support-for-Broadcast-Service) doc—Jul. 28, 2003. The following represent various conceptual changes that may be used to practice the method and apparatus of the present invention.

In accordance with the teachings of the present invention, the MS receives BSPM as one of the overhead messages. From the BSPM, the MS knows which broadcast service(s) is(are) available or currently running. The BSPM also indicates which broadcast service(s) are only offered with Dedicated Mode.

In accordance with the teachings of the present invention, in one embodiment, the following changes to the BSPM may be implemented:

- indication that the Dedicated Mode is currently supported (i.e., DEDICATED_MODE_SUP field);
- indication of which BCMCS_FLOW_ID is supported with Dedicated Mode;
- if DEDICATED_MODE_SUP is set to '1' (i.e., the Dedicated Mode is support) in the BSPM message, the BSPM may include Forward Supplemental Channel configuration information in the BSPM;
- while operating in Shared Mode, indication of which neighbor (i.e., cell) supports only the Dedicated Mode BCMCS_FLOW_ID; so that when the MS moves to that neighbor BS, the MS can send an Origination Message or Reconnect Message to request the broadcast service;
- with Dedicated Mode supported in the BSPM, the BS can indicate which BCMCS_FLOW_ID is only supported with Dedicated Mode (i.e., the DEDICATED_MODE_ONLY of the BCMCS_FLOW_ID is set to '1'). If DEDICATED_MODE_ONLY is set to '1', then:
    - indication that the LPM related and neighbor (NGHBR) related fields in BSPM correspond to the Forward Supplemental Channel;
    - the MS needs to send ORM (i.e. traffic channel setup) to request the program the end-user would like to view;
    - for each BCMCS_FLOW_ID specified in the BSPM, add a new neighbor BCS configuration mode (i.e. new NGHBR_BCS_CONFIG value) to indicate that the BCMCS_FLOW_ID is only functional in Dedicated Mode at this neighbor base station;
    - if the MS monitors a broadcast service (i.e. a BCMCS_FLOW_ID) on BSCH in idle state and receives a updated BSPM that indicates that the BCMCS_FLOW_ID is now only offered with Dedicated Mode, the MS sends an ORM or a Reconnect Message to request Dedicated Mode operation;
- If the MS needs to monitor a broadcast service that is only offered with Dedicated Mode while it is in idle mode, the MS need to send an Origination Message or Reconnection Message indicating that it wants to watch the service on the traffic channel;
    - while watching a Shared Mode broadcast service, if the MS is moving to a neighbor BS and the BSPM indicates the neighbor only offers the same service with Dedicated Mode, the MS will send an Origination Message or Reconnection Message to request the broadcast service;
    - a Service Option may need to be defined for certain BCMCS applications.

Various changes are suggested for the ORM/RCNM/EOM:

- the MS can use ORM, RCNM or EOM to request a Dedicated Mode broadcast service (BCMCS_FLOW_ID) that the end-user wants to watch;
- the BCMCS_ID_INCL field in the message(s) is set to '1' if a Dedicated Mode broadcast service is included in the message(s);
- Upon receiving the ORM or RCNM requesting a broadcast service, the BS can send ECAM to assign the traffic channel if the BS grants the request:
    - Using ECAM, the BS can set a different PLCM for the forward Fundicated channel.

Various traffic channel assignments and procedures should also be implemented for example:

- Upon receiving the ORM/RCNM/EOM, the BS can assign the traffic channel for the requested broadcast service(s) in one of (or combination of) the following ways:
    - Using the ECAM to assign the F-FCH/F-DCCH first, SCM to connect to traffic channel, then use ESCAM or UHDM to assign the F-SCH that carries the requested broadcast service(s). The SR_ID specified in SCM corresponds to the broadcast service (BCMCS_FLOW_ID) the MS requested;
    - If the broadcast service(s) is allowed to be transmitted on F-FCH or F-DCCH, the BS can use ECAM to assign the channel(s) and to indicate that the transmitted broadcast service(s) is on F-FCH or F-DCCH;
    - If the MS is already on the traffic channel and the end-user request broadcast service(s) using EOM, the BS can use UHDM to assign the F-SCH to the MS if F-SCH was not an active;
- If the BS does not offer or does not grant the requested broadcast service(s), the BS sends the Reject Order to reject the end-user request.

While the MS monitors a Dedicated Mode broadcast service, the MS should take proper action based on the information received from UHDM; the actions include:

- an indication whether Dedicated Mode is supported at the target BS;
- if Dedicated Mode is supported at the target BS, indication of which broadcast service(s) is(are) offered with the correspondence LPM information;
- If Dedicated Mode is not supported at the target BS, the MS can send a Release Order to release the traffic channel, or remain on the traffic channel but stop monitoring the broadcast service(s);
- If the Dedicated Mode is supported at the target BS, but the broadcast service(s) (BCMCS_FLOW_ID) currently monitored is not offered at the target BS, after handoff, the MS can stop monitoring the broadcast service. The MS may send an indication to the end-user to indicate that the service is not available;
- After handoff, the MS can use EOM to request an available broadcast service or autonomously receive a broadcast service in progress;
- In the UHDM/GHDM, the BS can specify the LPM information of the target base station.

The BS can use the Extended Release Message (ERM) to do the following:

- BS can use ERM to direct MS to get Shared Mode broadcast service in the idle state by setting Shared Mode indicator to '1'; otherwise, the ERM is implemented with a normal release.

The flow diagrams associated with FIG. 3, FIG. 4, FIG. 5 and FIG. 6 may be used to display one embodiment of how the foregoing changes to the TIA/EIA IS-2000.5-C, Signaling Standards for cdma2000 Spread Spectrum Systems—Release C, May 2002 and 3GPP2, C23-20020708-007-R1(Signaling-Support-for-Broadcast-Service) doc—Jul. 28, 2003 may be implemented.

Figure 3:
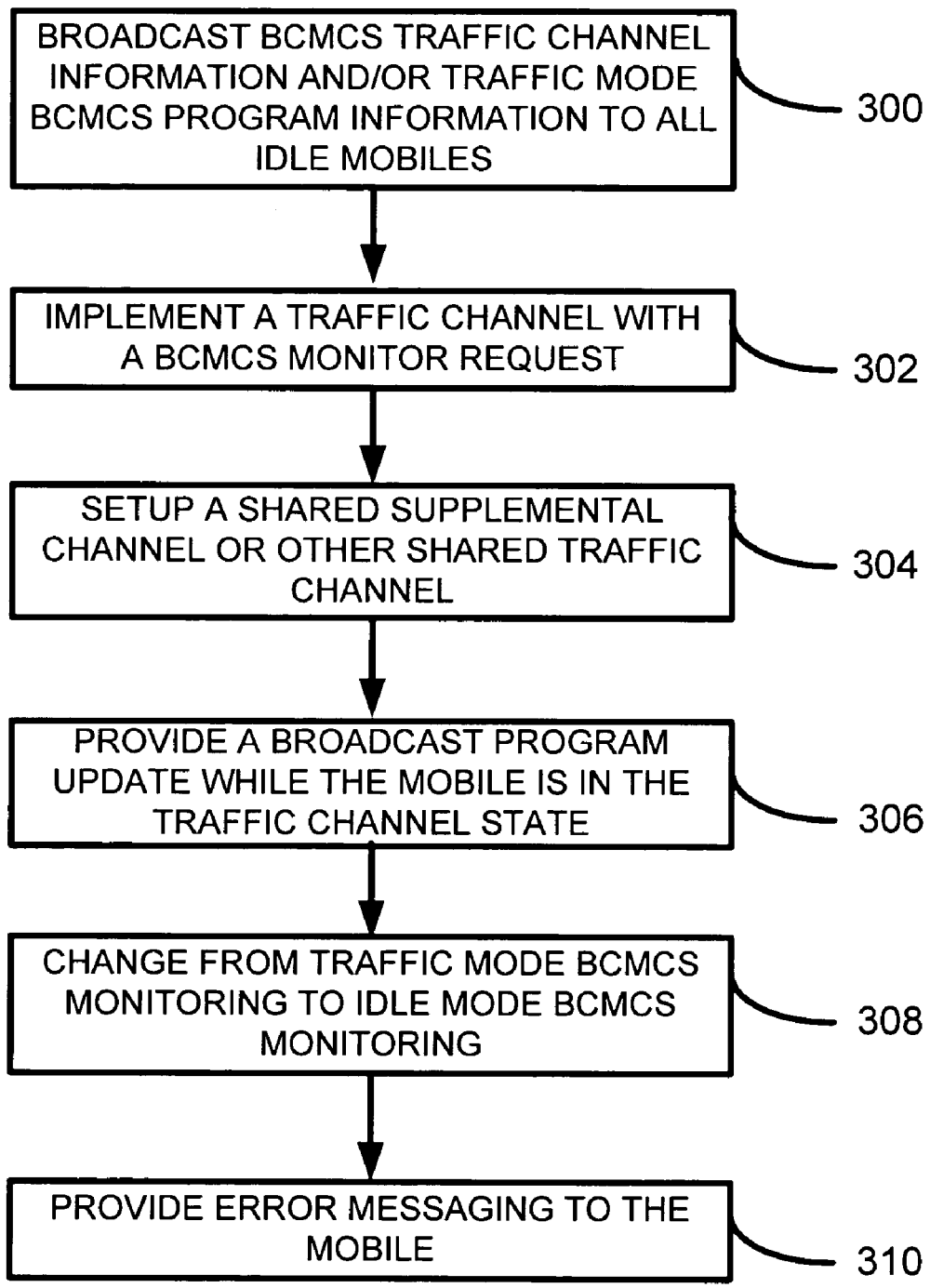
FIG. 3 displays a flow diagram detailing a method of operating in accordance with the teachings of the present invention.

FIG. 3 displays a flow diagram depicting a method of implementing BCMCS services on a traffic channel. At step 300 Broadcast BCMCS traffic channel information and traffic mode BCMCS program information are communicated to all idle mobiles. In one embodiment of the present invention, traffic channel information and program information are broadcast to the mobile in idle mode using an overhead message such as a BSPM messages. Once the mobiles receive the BSPM messages the mobiles are aware of all of the program information available. In another embodiment, when the mobile is in the traffic mode, traffic channel information and traffic mode BCMCS program information may be communicated using UHDM messages.

At step 302, a traffic channel is implemented using a BCMCS monitor request. In one embodiment of the present invention, an origination message is used to establish a traffic channel. As a result of the foregoing step (i.e., 300) the mobile is in idle mode and knows which programs are offered on the traffic channel, since the mobile received the BSPM message. The mobile then sends an origination message, which includes the program selected by the end-user (i.e., the program that the mobile should monitor). In one embodiment the program is identified using the broadcast multicast ID. In a second embodiment, the program is identified using the flow ID. The base station receives the origination message and processes the origination message. As a result of receiving the origination message the base station is aware that the mobile wants to move to the traffic channel and the specific program selected by the mobile. The base station assigns a traffic channel to the mobile station. In one embodiment, when the base station assigns the traffic channel to the mobile the base station also communicates the traffic information related to BCMCS to the mobile.

At step 304, once the base station has assigned a traffic channel, the base station uses an ESCAM message to setup the traffic channel with the mobile. The ESCAM message includes information on which supplemental channel is offering the program. Once the mobile receives the information then the mobile can change to that supplemental channel and start to monitor the BCMCS. In one embodiment, the base station may assign the same supplemental channel to each mobile by using the same long code mask specified in the ESCAM message (i.e., public long code mask). As a result, each mobile channel can monitor the same supplemental channel.

At step 306, the base station provides a broadcast program update while the mobile is on traffic channel. The base station provides a broadcast program update in two scenarios: 1) the mobile is monitoring a traffic mode program or 2) the mobile is on the traffic channel but has not started monitoring a traffic mode program. In the first scenario when the mobile is monitoring a traffic mode program, in accordance with the teachings of the present invention, a UHDM is used to provide the program update. In the second scenario when the mobile is on the traffic channel but has not started monitoring a traffic mode program, the mobile may receive the update on the traffic channel, and based on the update the mobile may request monitoring a traffic mode BCMCS. In one embodiment of the present invention, the mobile communicates an enhanced origination message, which identifies the BCMCS program that the mobile wants to monitor. If the base station grants the request, the base station then provides the appropriate information using a traffic channel-signaling message (e.g., ESCAM, UHDM) to the mobile. Upon receiving the message, the mobile station can starting monitoring the traffic mode BCMCS.

In a third embodiment a new message may be developed to transmit the update information. For example, a new traffic channel message may be developed to transmit the program.

At step 308, the mobile changes from traffic mode BCMCS monitoring to idle mode BCMCS monitoring. The base station initiates changing from traffic mode to idle mode. In one embodiment, the base station communicates an extended release message that includes the broadcast multicast information. When the mobile receives the extended release message the mobile changes from the traffic mode and monitors the program on the idle mode. For example, the mobile station may be monitoring a specific BCMCS flow id or traffic channel ID. If enough end-users start to watch the particular program (i.e., same flow ID and traffic channel ID), it may make sense to use the idle mode. The BS sends an extended release message, which includes the program ID that is on idle mode to each individual mobile station. The mobile station is able to release the traffic channel and monitor the program in idle mode because in the release message the base station provided the program ID and channel ID information so that the mobile could change to the program after releasing the traffic channel.

At step 310 error messaging is provided to the mobile. In one embodiment, the base station responds to a BCMCS request by communicating that the request is denied and the reason that the request is denied. In accordance with the teachings of the present invention, a release order is defined for providing error messaging to the mobile. The release order includes the logic (i.e., code, software) required to manage error scenarios. In one embodiment, the logic states that if for any reason the base station cannot grant a request the release order is sent to the mobile. The release order may include the reason for denying the request, in the release order. The defined release order may be implemented in traffic mode or in idle mode. For example, if the mobile station is already on the traffic channel and the mobile station wants to monitor a new program we can communicate a new release order.

In accordance with the teachings of the present invention there are several embodiments in which a BS communicates the reason for denying a request for BCMCS service. In one embodiment, the BS receives an idle mode BCMCS request from a mobile. The BS denies the request by communicating a message while the base station is in the idle state. The message also informs the MS of the reason for denial of the request. In another embodiment, the MS request traffic mode broadcast multicast and sends an origination message including a program ID in the origination message to the BS. If for some reason the BS cannot broadcast this program on the traffic mode then, the BS can send a message such as the release order on the traffic channel to the MS, telling the MS that the request is denied and the reason that the request is denied. In another embodiment, the MS is already on the traffic channel and while the MS is on the traffic channel the MS would like to monitor a traffic mode broadcast multicast program. Therefore, the MS sends an EOM to the BS. If for some reason the BS cannot provide the service, the BS may send a message such as the release order telling the MS that the request is denied and the reason that the request is denied. In another scenario, the MS is already monitoring a traffic mode broadcast multicast program. For example, the end-user moves into a new cell. The MS request service from the new cell. If for some reason, the new BS cannot provide the service; the new base station may provide an error message, such as a release order, with the appropriate code that details why the request for service has been denied. As a result, the mobile station will stop monitoring the program.

Figure 4:
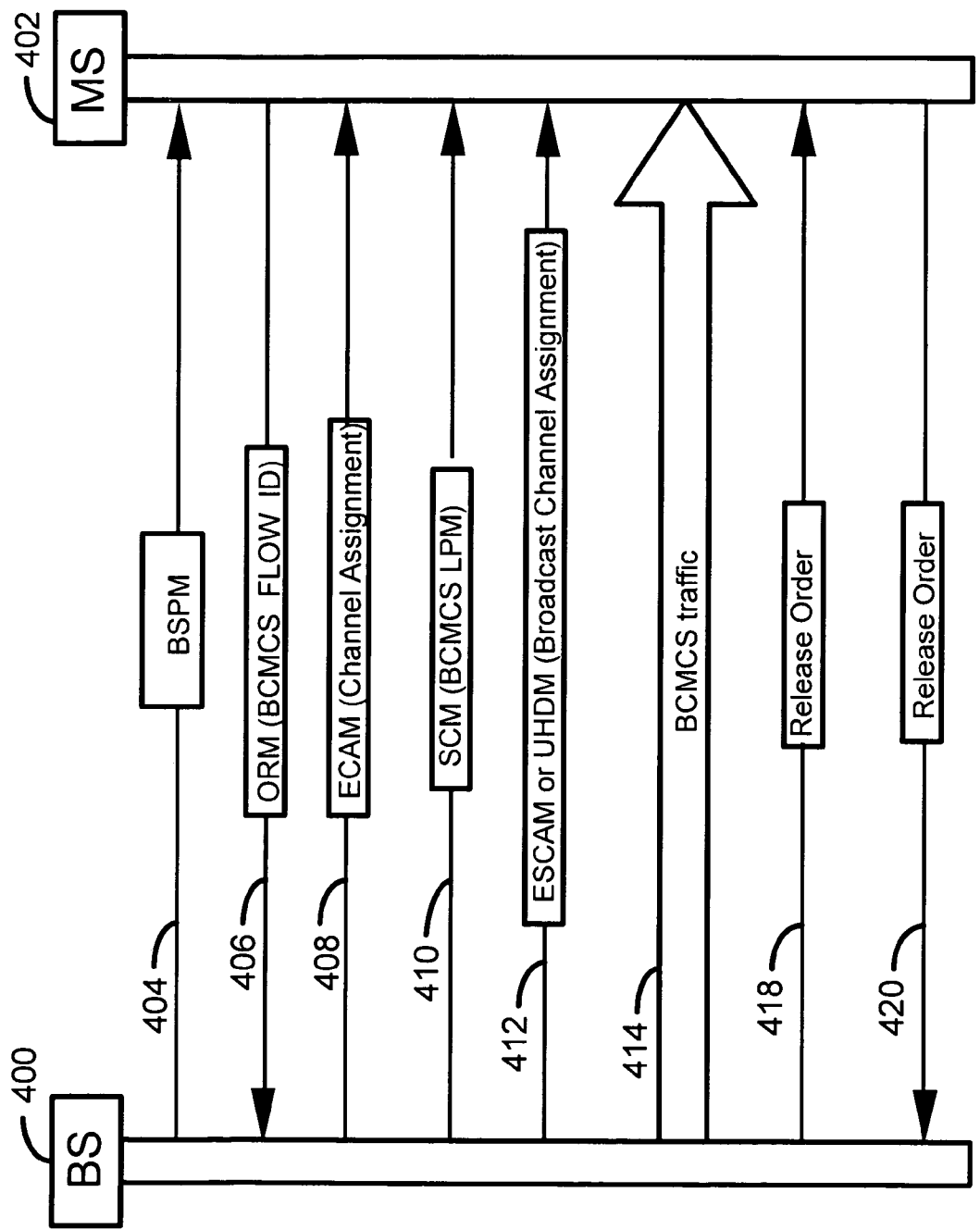
FIG. 4 displays a message flow diagram of an MS requesting traffic mode BCMCS.

FIG. 4 displays a flow diagram depicting a request for traffic mode BCMCS. A BS 100 is shown and an MS 102 is shown. The BS 400 sends a BSPM message to the MS 102. Sending the BSPM message 404 to provide program information and additional information associated with the broadcast multicast. By sending the BSPM message the BS 400 is able to communicate which programs are available to the MS 402. In addition, using the BSPM the MS 400 is also able to indicate which programs are available on dedicated mode. The MS 102 responds with a ORM message 406 with a BCMCS_FLOW_ID identified. Sending the ORM message 406 enables the MS 402 to select a specific program. The BS 100 communicates an ECAM message 408 with a channel assignment. The BS 400 communicates the ECAM message to setup the channel (i.e., such as fundicated channel). The BS 100 then communicates a SCM with a BCMCS LPM identified. The SCM message 410 identifies that all the negotiations required to setup the channel are done. The SCM message includes the logical and physical mapping (i.e., LPM) required to implement the BCMCS service. The BS 100 communicates either an ESCAM or a UHDM with the broadcast channel assignment. The BS 400 uses the ESCAM or UHDM message 408 to identify which channel (i.e., supplemental channel) that the mobile is assigned to. Broadcast traffic 414 is then communicated from the BS 100 to the MS 102. When it is time to release the traffic channel the BS 400 communicates a release order 418 and the MS 402 communicates a release order 420. In one embodiment, the Release Order 418 is communicated when the program is terminated. In accordance with the teachings of the present invention, two release orders 418 may be implemented. In one embodiment, the Release Order includes the reason that the program has been released. In another embodiment, the Release Order 418 is implemented with an Extended Release Message. For example, when the MS 404 is moving from traffic mode to idle mode, the Extended Release Message may be used to tell the MS 404 to move to idle mode and to provide the program ID and the channel information that the MS 404 should use when the MS 402 is in idle mode.

Figure 5:
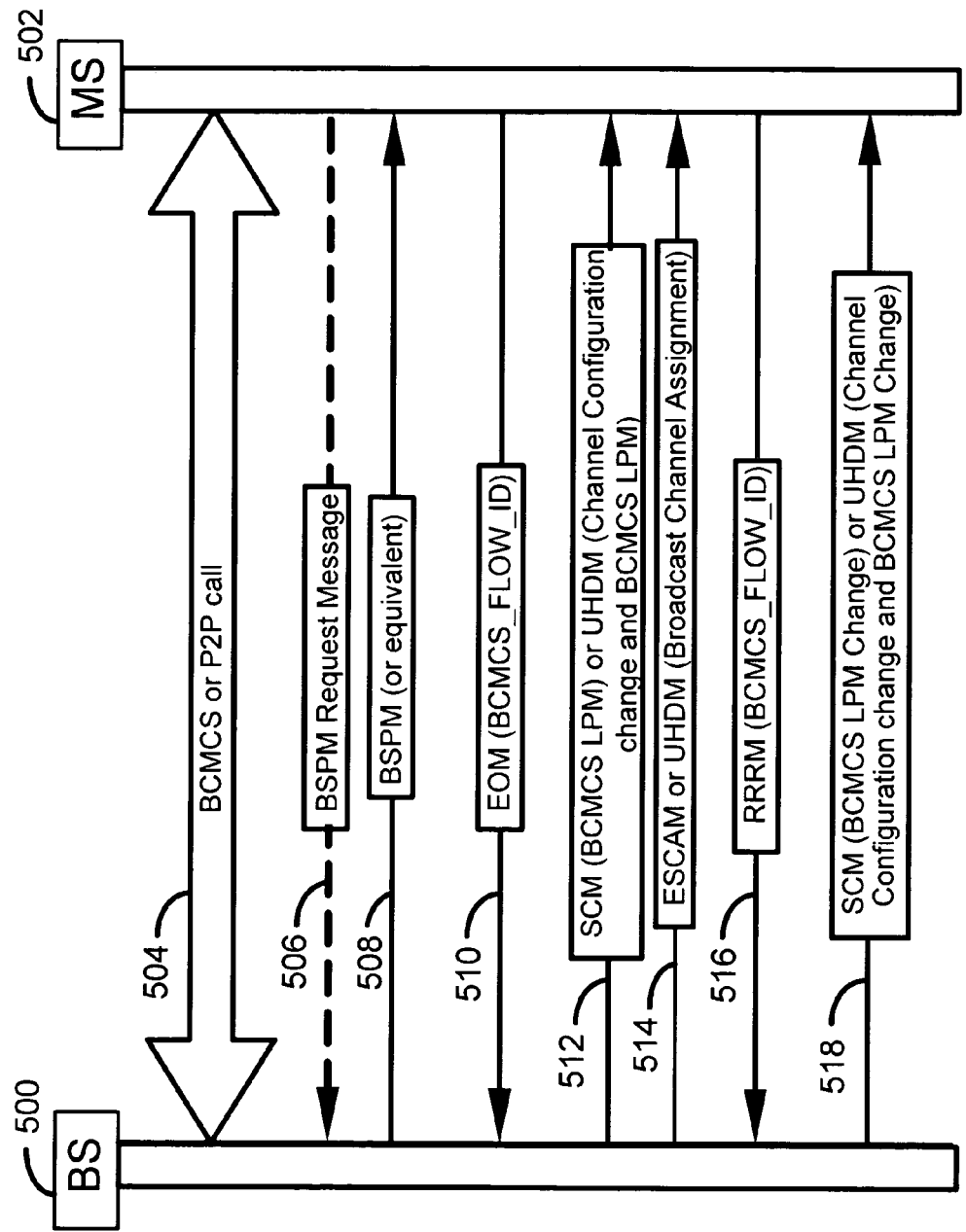
FIG. 5 displays a message flow diagram of an MS requesting traffic mode BCMCS when the MS is already on the traffic channel.

FIG. 5 displays a flow diagram depicting a request for traffic mode BCMCS when the MS is already on the traffic channel. A BS 500 and an MS 502 are shown. The MS 502 is already on the traffic channel and either has a dedicated call or is already monitoring a BCMCS program as shown by 504. The MS 502 communicates a BSPM request message 506. The BSPM message 506 enables the MS 502 to request program information from the BS 500. The BS 500 communicates a BSPM message 508 or its equivalent. The BSPM message provides updated traffic mode BCMCS information such as program information. The MS 502 communicates an EOM message 510 with BCMCS_FLOW_ID defined. The EOM message 510 is used to request a traffic mode program. The BS 500 communicates an SCM message or a UHDM message 512. If an SCM message 512 is sent the BCMCS LPM is defined. If a UHDM message is communicated a channel configuration change and the BCMCS LPM is identified. The LPM provides the logical-to-physical mapping information. Once the MS 502 receives the SCM message or the BCMCS LPM message the MS can watch the requested BCMCS program. The BS 500 communicates either an ESCAM or a UHDM message 514 with the broadcast channel assignment. The BS 500 uses the ESCAM or UHDM message 514 to identify which channel (i.e., supplemental channel) that the mobile is assigned to. If the MS 502 wants to communicate to the BS 500 that the MS 502 has stopped monitoring a BCMCS program but is still on the traffic channel, the MS 502 can communicate the RRRM message 516 with the BCMCS_FLOW_ID included. In response, the BS 500 communicates a UHDM message 518. When a UHDM message is communicated a channel configuration change and the BCMCS LPM is identified. For example, when the mobile moves from one cell to another cell the UHDM message may be communicated and the configuration change and the BCMCS LPM information for BCMCS service in the new cell is communicated.

Figure 6:
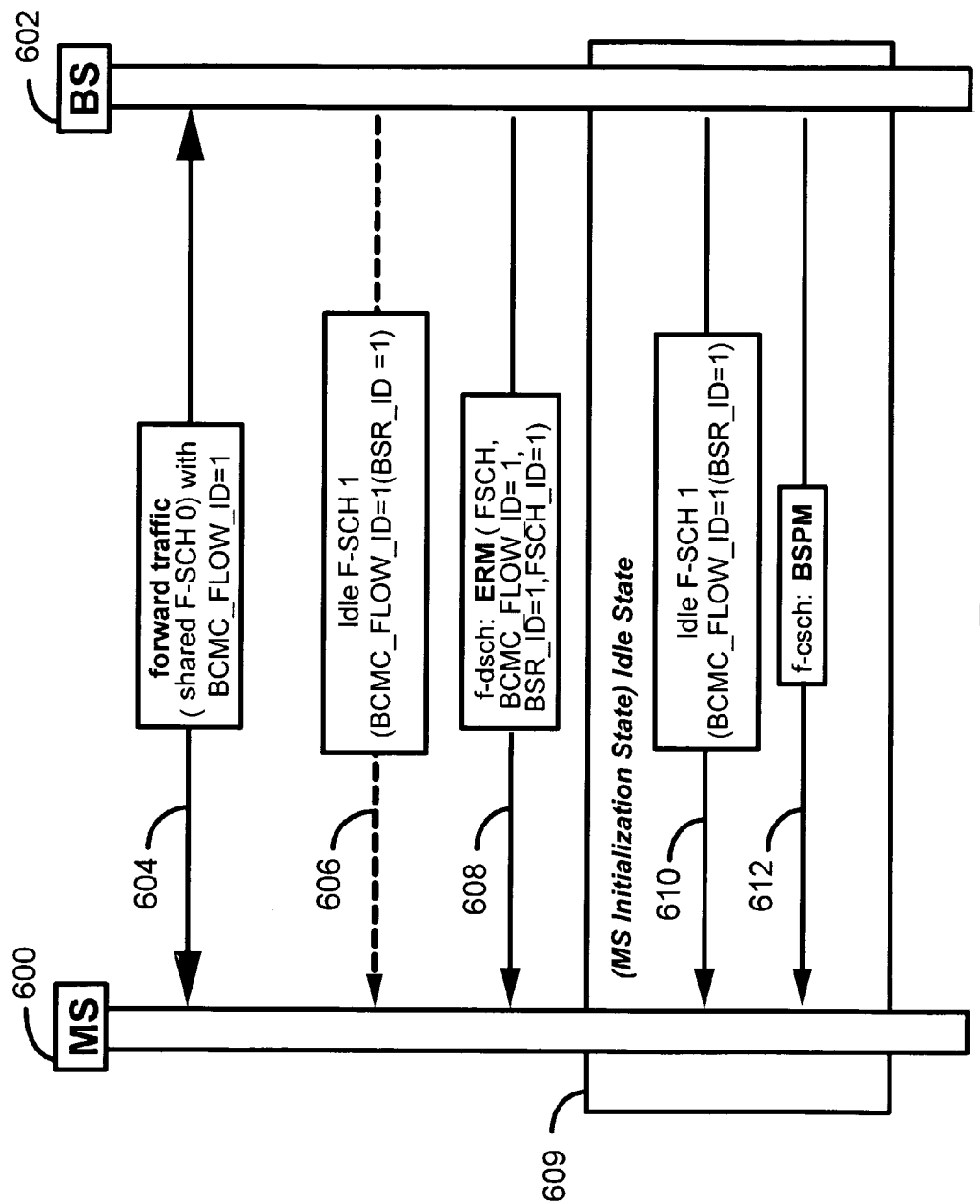
FIG. 6 displays a message flow diagram implemented in moving an MS currently monitoring the traffic mode BCMCS to Idle mode BCMCS.

FIG. 6 displays a message diagram depicting a scenario when the mobile moves from traffic mode BCMCS to idle mode BCMCS. An MS 600 is in communication with a BS 602. At 604 the BS is transmitting traffic mode BCMCS program information using shared F-SCH 0 (i.e., shared supplemental channel) with BCMC_FLOW_ID=1. At 606 the BS starts transmitting idle mode BCMC before moving the MS to idle mode, using idle F-SCH 0 BCMC_FLOW_ID=1 (BSR_ID=1, which is an ID to identify the service). At 608, the BS decides to release traffic mode BCMCS and direct the MS to use the idle mode, by transmitting F-dsch: ERM (FSCH, BCMC_FLOW_ID=1, BSR_ID=1, FSCH_ID=0). The ERM message is sent to each mobile. The MS 600 then moves to the initialization state or the idle state as stated at 609. At 610, the BS 602 communicates an idle F-SCH 1 (BCMC_FLOW_ID=1(BSR_ID=1) to the MS 600. At 612, the BS 602 communicates f-csch: BSPM to the MS 600.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method of implementing broadcast multicast services in a wireless mobile network, the method comprising the steps of:
   communicating a broadcast system parameter message (BSPM) to a mobile, the BSPM including broadcast program information;
   receiving an origination message from the mobile, the origination message including information identifying a selected broadcast program;
   in response to receiving the origination message, assigning a traffic channel for the mobile and transmitting a channel assignment message to the mobile identifying the assigned traffic channel;
   transmitting the selected broadcast program over the assigned traffic channel; and
   transmitting a broadcast program information update to the mobile using a universal handoff direction message (UHDM).

2. A method in accordance with claim 1 wherein the information identifying a selected broadcast program comprises a one of a broadcast multicast ID and a flow ID.

3. A method in accordance with claim 1 wherein the assigned channel is a forward fundamental channel.

4. A method in accordance with claim 1 wherein the assigned channel is a forward supplemental channel.

5. A method in accordance with claim 4 wherein the traffic assignment message includes a code mask.

6. A method in accordance with claim 5 wherein the code mask comprises a public long code mask.

7. A method in accordance with claim 6 wherein transmitting the channel assignment message further comprises:
   transmitting an extended supplemental channel assignment message (ESCAM).

8. A method in accordance with claim 1 further comprising:
   receiving a second origination message from a second mobile, the second origination message including information identifying the selected broadcast program;
   in response to receiving the second origination message, assigning the traffic channel for the second mobile and transmitting a second channel assignment message to the second mobile identifying the assigned traffic channel.

9. A method in accordance with claim 8 wherein the assigned channel is a forward supplemental channel.

10. A method in accordance with claim 9 wherein the traffic assignment message comprises a public long code mask.

11. A method in accordance with claim 1 further comprising:
   during transmission of the selected broadcast program, communicating a release message to the mobile, the release message operable to cause the mobile to change from traffic mode broadcast multicast services to idle mode broadcast multicast services in response to receiving the release message, the release message including information identifying the selected broadcast program.

12. A method of implementing broadcast multicast services in a wireless mobile network, the method comprising the steps of:
   communicating a broadcast system parameter message (BSPM) to a mobile, the BSPM including broadcast program information;
   receiving a first origination message from the mobile, the first origination message including information identifying a selected broadcast program;
   in response to receiving the origination message, assigning a traffic channel for the mobile and transmitting a channel assignment message to the mobile identifying the assigned traffic channel;
   transmitting the selected broadcast program over the assigned traffic channel;
   receiving a second origination message from a second mobile, the second origination message including information identifying the selected broadcast program;
   in response to receiving the second origination message, assigning the traffic channel for the second mobile and transmitting a second channel assignment message to the second mobile identifying the assigned traffic channel.

13. A method in accordance with claim 12 wherein the information identifying the selected broadcast program comprises a one of a broadcast multicast ID and a flow ID.

14. A method in accordance with claim 12 wherein the assigned channel is a forward fundamental channel.

15. A method in accordance with claim 12 wherein the assigned channel is a forward supplemental channel.

16. A method in accordance with claim 15 wherein transmitting the channel assignment message further comprises:
   transmitting an extended supplemental channel assignment message (ESCAM).

17. A method in accordance with claim 16 wherein the ESCAM includes a code mask.

18. A method in accordance with claim 17 wherein the code mask comprises a public long code mask.

19. A method in accordance with claim 12 further comprising:
   during transmission of the selected broadcast program, communicating a release message to one of the first and second mobiles, the release message operable to cause the mobile to change from traffic mode broadcast multicast services to idle mode broadcast multicast services in response to receiving the release message, the release message including information identifying the selected broadcast program.

20. A method in accordance with claim 12 further comprising:
   during the transmission of the selected broadcast program, transmitting broadcast program information updates within a universal handoff direction message (UHDM).

* * * * *

UNITED STATES PATENT AND TRADEMARK OFFICE
CERTIFICATE OF CORRECTION

| | | |
|---|---|---|
| PATENT NO. | : 7,394,777 B2 | Page 1 of 1 |
| APPLICATION NO. | : 10/903207 | |
| DATED | : July 1, 2008 | |
| INVENTOR(S) | : Ke-Chi Jang and Ching-Chung Wang | |

It is certified that error appears in the above-identified patent and that said Letters Patent is hereby corrected as shown below:

Title Page, after Item "(22) Filed: July 30, 2004" insert the following:
-- Related U.S. Application Data
   Provisional application no. 60/491,407, filed on July 31, 2003 --
Col. 3, line 60, delete "MCNCS_FLOW_ID" and insert -- BCMCS_FLOW_ID --

Signed and Sealed this

Thirtieth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,394,777 B2  Page 1 of 1
APPLICATION NO. : 10/903207
DATED : July 1, 2008
INVENTOR(S) : Ke-Chi Jang and Chung-Ching Wang It is certified that error appears in the above-identified patent and that said Letters Patent is hereby corrected as shown below:

Title page item [75]
Inventors: The second joint inventor's name is incorrectly listed as "Ching-Chung Wang." Please correct the second joint inventor's name to -- Chung-Ching Wang --.

Signed and Sealed this

Twenty-seventh Day of January, 2009

JOHN DOLL
*Acting Director of the United States Patent and Trademark Office*